(12) United States Patent
Sakota (10) Patent No.: US 12,240,622 B2
(45) Date of Patent: Mar. 4, 2025

(54) AIRCRAFT ASSEMBLY

(71) Applicant: AIRBUS OPERATIONS LIMITED, Bristol (GB)

(72) Inventor: Nebojsa Sakota, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/127,333

(22) Filed: Mar. 28, 2023

(65) Prior Publication Data

US 2023/0406529 A1    Dec. 21, 2023

(30) Foreign Application Priority Data

Mar. 29, 2022  (GB) ...................................... 2204465

(51) Int. Cl.
| | | |
|---|---|---|
| *B64D 37/30* | (2006.01) | |
| *B64C 3/26* | (2006.01) | |
| *B64D 37/32* | (2006.01) | |

(52) U.S. Cl.
CPC ................ *B64D 37/30* (2013.01); *B64C 3/26* (2013.01); *B64D 37/32* (2013.01)

(58) Field of Classification Search
CPC ........ B64D 37/30; B64D 37/00; B64D 37/32; B64D 37/34; B64C 3/34
See application file for complete search history.

(56) References Cited

U.S. PATENT DOCUMENTS

| | | |
|---|---|---|
| 7,302,936 B2 | 12/2007 | Stolarz et al. |
| 8,973,872 B2 | 3/2015 | Haug |
| 9,174,740 B2 | 11/2015 | Stolte et al. |
| 9,310,023 B2 | 4/2016 | Regan |
| 9,447,899 B2 * | 9/2016 | Minami ................. F16L 3/1222 |
| 9,458,954 B2 | 10/2016 | Baur et al. |
| 9,933,093 B2 * | 4/2018 | Corrêa ..................... F16L 27/12 |
| 9,939,087 B2 | 4/2018 | Kolarski et al. |
| 2012/0104172 A1 | 5/2012 | Haug et al. |
| 2012/0248251 A1 | 10/2012 | Tichborne et al. |
| 2013/0087238 A1 | 4/2013 | Mercier |
| 2013/0288160 A1 * | 10/2013 | Kurre ................ H01M 8/04201 |
| | | 429/513 |
| 2014/0124077 A1 | 5/2014 | Malas et al. |
| 2015/0053820 A1 | 2/2015 | Napp |

(Continued)

FOREIGN PATENT DOCUMENTS

| | | |
|---|---|---|
| EP | 2 505 982 A2 | 10/2012 |
| EP | 2 949 980 | 12/2015 |

(Continued)

OTHER PUBLICATIONS

Search Report for GB2204465.5, dated Sep. 22, 2022, 4 pages.

(Continued)

*Primary Examiner* — Tye William Abell
*Assistant Examiner* — Justin Michael Heston
(74) *Attorney, Agent, or Firm* — Nixon & Vanderhye P.C (57) ABSTRACT

An aircraft assembly is disclosed including an aircraft panel, a channel attached to the aircraft panel, a fuel line for carrying cryogenic fuel, the fuel line disposed in the channel, and a sealed containment space around the fuel line for containing cryogenic fuel leaked from the fuel line, the containment space defined between the channel, the fuel pipe, and the aircraft panel.

18 Claims, 13 Drawing Sheets

(56) References Cited

U.S. PATENT DOCUMENTS

| | | | |
|---|---|---|---|
| 2015/0336680 A1* | 11/2015 | Schumacher | F17C 3/00 |
| | | | 244/135 B |
| 2017/0267368 A1* | 9/2017 | Hara | B64C 1/1453 |
| 2019/0039747 A1* | 2/2019 | Gilbertson | F16L 3/222 |
| 2020/0031489 A1* | 1/2020 | Edwards | B64D 37/005 |
| 2020/0031499 A1* | 1/2020 | Petit | F16L 3/18 |
| 2020/0393072 A1 | 12/2020 | Shamkhi | |
| 2022/0033060 A1* | 2/2022 | Behzadpour | B64C 3/32 |
| 2023/0086167 A1* | 3/2023 | Milliere | B64D 37/30 |
| | | | 220/88.3 |

FOREIGN PATENT DOCUMENTS

| | | | | |
|---|---|---|---|---|
| EP | 2 668 092 | | 7/2016 | |
| EP | 4 155 213 A1 | | 3/2023 | |
| WO | WO-2012088055 A1 * | | 6/2012 | B64D 37/00 |

OTHER PUBLICATIONS

Extended European Search Report for Application No. 23163390.0, six pages, dated Aug. 22, 2023.
Intention to Grant for Application No. EP 23163390.0, seven pages, dated Oct. 4, 2024.

* cited by examiner

AIRCRAFT ASSEMBLY

CROSS RELATED APPLICATION

This application claims priority to United Kingdom Patent Application GB 2204465.5, filed Mar. 29, 2022, the entire contents of which is hereby incorporated by reference.

FIELD OF THE INVENTION

The present invention relates to an aircraft assembly, an aircraft, and a method of assembling an aircraft wing box.

BACKGROUND OF THE INVENTION

The use of alternative fuels, such as liquid hydrogen, are one of several approaches aimed at meeting future emissions targets. A difficulty in providing aircraft that are powered by fuels such as hydrogen is the need to store the fuel in pressurised fuel tanks. These pressurised fuel tanks typically require significant amounts of space and are therefore positioned away from the engines and other parts of the fuel system. The fuel lines may therefore extend significant distances across the aircraft.

This can present various challenges in the assembly of the aircraft, as well as present design considerations in terms of ensuring any leaks from the hydrogen fuel lines are contained.

SUMMARY OF THE INVENTION

A first aspect of the invention provides an aircraft assembly, comprising: an aircraft panel; a channel attached to the aircraft panel; a fuel line for carrying cryogenic fuel, the fuel line disposed in the channel; and a sealed containment space around the fuel line for containing cryogenic fuel leaked from the fuel line, the containment space defined between the channel, the fuel line, and the aircraft panel.

With this arrangement, any leakages or evacuations (e.g. emergency releases) of cryogenic fuels from the fuel line can be contained within the channel. The cryogenic fuel can be also be directed by the channel so that the cryogenic fuel is releasable at a designated location not necessarily co-located with the fuel line (e.g. an emergency exit line).

The aircraft assembly also provides advantages in its assembly, as the channel can be attached to the aircraft panel prior to integration of the aircraft panel (e.g. spar, cover, fairing) into the main aircraft assembly. This makes assembly of the aircraft easier and simpler, as there is no need for additional steps to be performed on the (e.g.) wing box that would ordinarily necessitate removing parts of the wing box in order to access the inner space of the wing box. The assembly process achievable as a result of this channel also means that the fuel line can also be assembled in larger sections within the wing box.

The channel may be rigidly attached to the aircraft panel, e.g. by fasteners or adhesive. The channel may be integral to the aircraft panel.

The fuel line may be configured to convey hydrogen fuel, and preferably liquid hydrogen fuel.

The channel may comprise fibre-reinforced composite materials.

The fibre-reinforced composite materials may comprise a metallic layer configured to decrease the permeability of the channel. The metallic layer may be between fibre reinforced layers of the channel.

The aircraft panel may comprise fibre-reinforced composite materials.

The aircraft assembly may comprise a vacuum or nitrogen in the containment space.

The channel may be spaced from the cryogenic fuel line.

The fuel line may be moveable axially relative to the channel.

The aircraft assembly may comprise a valve fluidically connected to the containment space.

The valve may be connected at a first end to the containment space and at a second end to atmosphere.

The aircraft panel may comprise an aircraft outer skin and/or a fairing.

The aircraft assembly may comprise two or more fuel lines for carrying cryogenic fuel, the fuel lines disposed in the channel.

The aircraft panel may comprise a spar of an aircraft wing.

The aircraft panel may comprise a cover of an aircraft wing.

The aircraft assembly may comprise an aircraft wing, wherein the channel extends along at least a portion of the aircraft wing.

The aircraft assembly may comprise an aircraft wing box, wherein the channel is within the wing box.

The aircraft assembly may comprise an aircraft fuselage, wherein the channel extends along at least a portion of the aircraft fuselage.

The channel may extend between a fuel tank for storing cryogenic fuel and an aircraft power plant.

The channel may extend between a fuel tank for storing cryogenic fuel and an aircraft refuelling port.

A second aspect of the invention provides an aircraft comprising the aircraft assembly of the first aspect.

A further aspect of the invention provides a method of assembling an aircraft wing box, comprising: the aircraft assembly of the first aspect wherein the aircraft panel comprises a spar and/or cover of an aircraft wing; the method comprising: attaching the aircraft assembly to one or more aircraft wing ribs.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
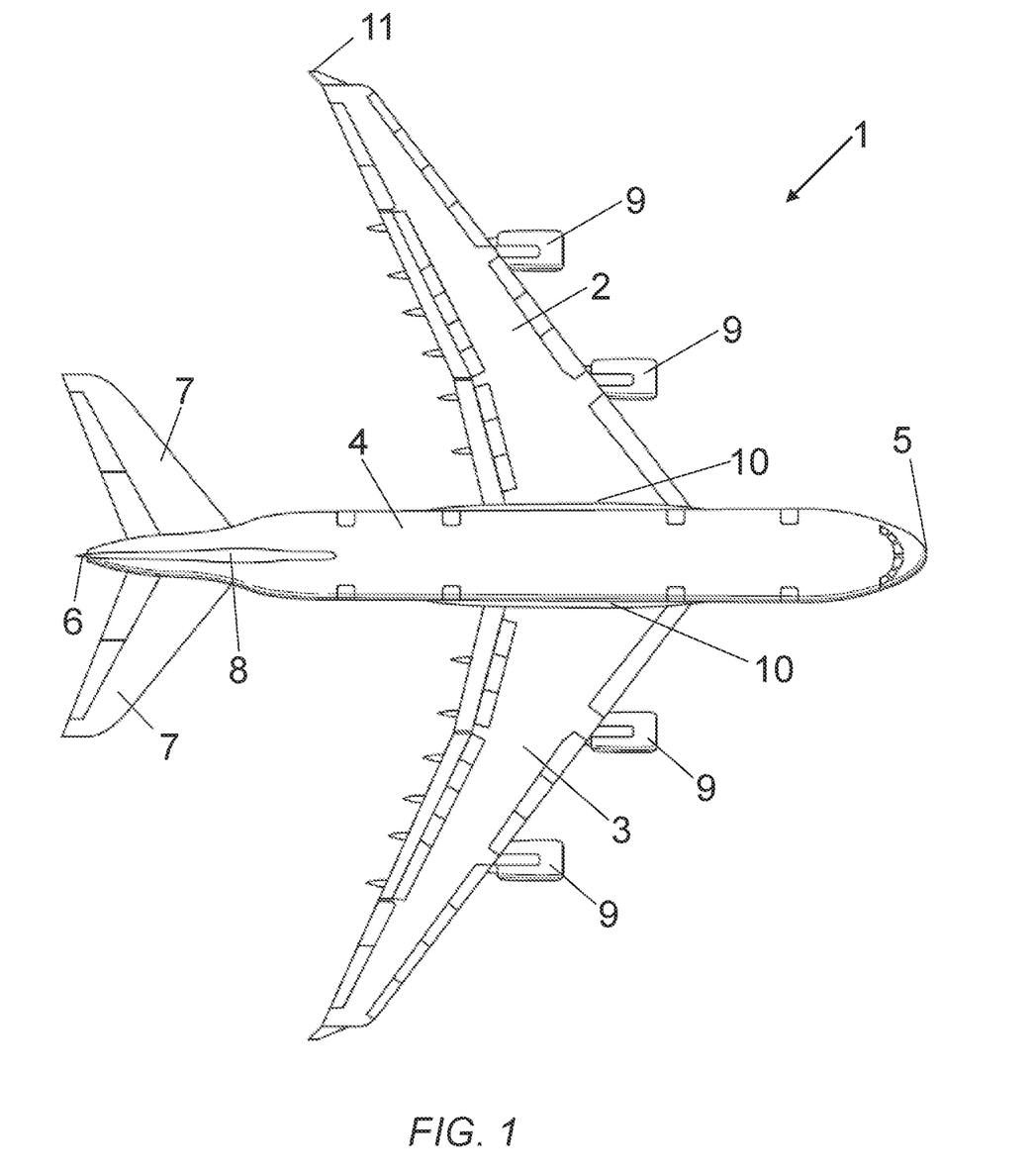
FIG. 1 shows an aircraft.

FIG. 1 shows an aircraft 1 with port and starboard fixed wings 2, 3, engines 9, a fuselage 4 with a nose end 5 and a tail end 6, the tail end 6 including horizontal and vertical stabilising surfaces 7, 8. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

Each wing 2, 3 of the aircraft 1 has a cantilevered structure with a length extending in a span-wise direction from a wing root 10 to a wing tip 11, the root 10 being joined to the aircraft fuselage 4.

Endeavours to increase aircraft efficiency mean that improvements to existing aircraft are continuously being made, with one such solution being the use of cryogenic fuels such as liquid hydrogen.

Hydrogen may be utilised as an aviation fuel in a number of ways, such as hydrogen direct burn (e.g. a modified gas turbine engine may provide power by burning hydrogen in the turbojet combustion chambers) or converting the hydrogen to electricity by using fuel cell technology in which the electrochemical cell converts the chemical energy of the hydrogen fuel and an oxidising agent (e.g. oxygen) into electricity through redox reactions.

Figure 2:
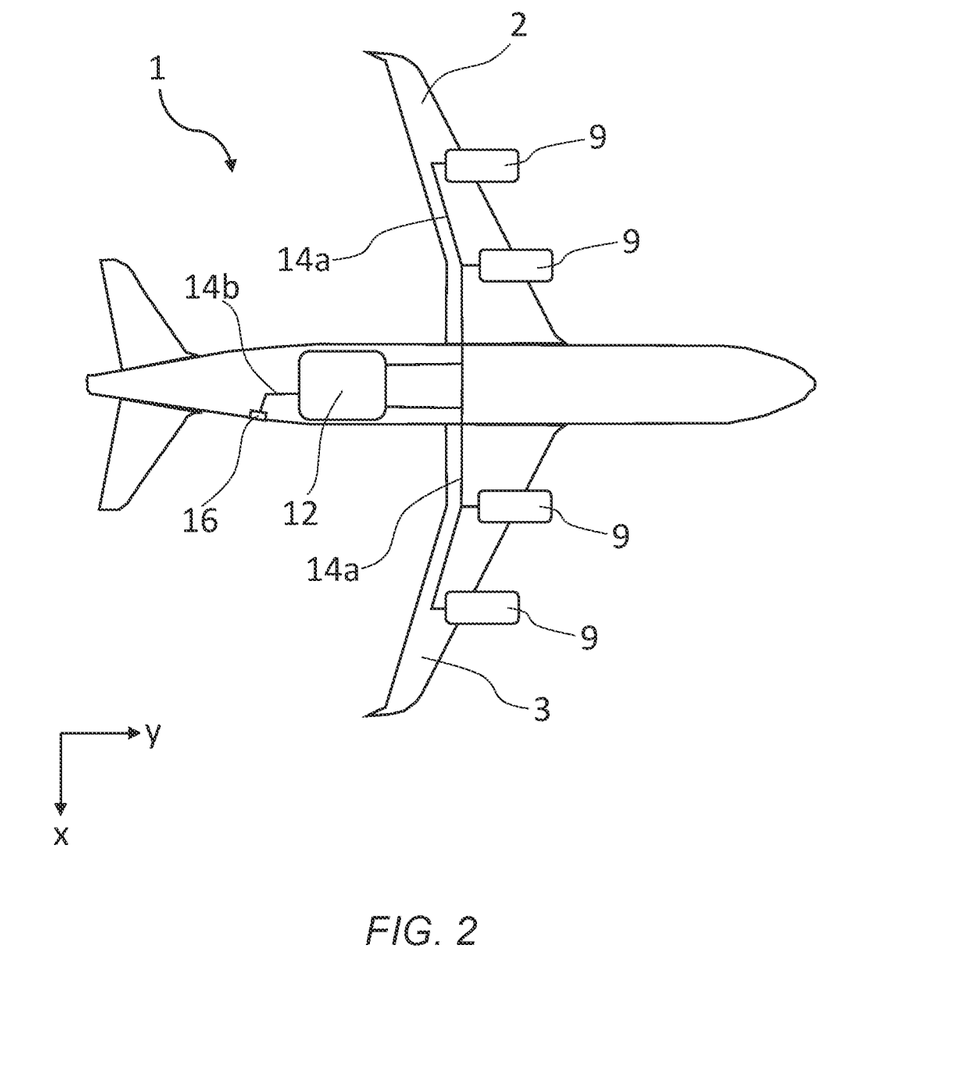
FIG. 2 shows an aircraft comprising a fuel system.
Figure 3:
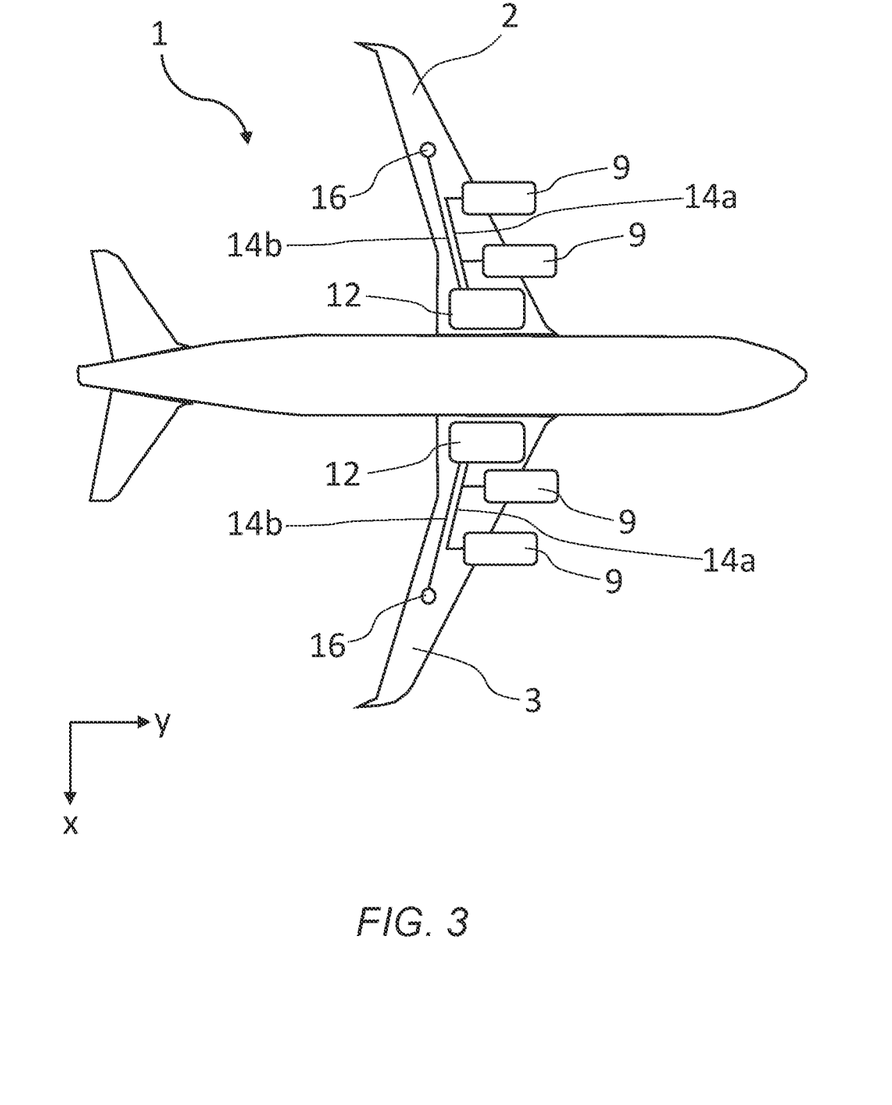
FIG. 3 shows an aircraft comprising an alternative fuel system.

The hydrogen tank(s) 12 may be located in any suitable location on the aircraft 1, but are typically located in separate tanks below the wings 2, 3 (e.g. in fuel pods), in the wings 2, 3 or in one or more fuel tanks 12 located within or adjacent the fuselage 4. FIG. 2 shows a hydrogen fuel tank 12 located towards the rear of the fuselage 4, whilst FIG. 3 shows the tanks located in the wings 2, 3.

Hydrogen fuel lines 14a may extend from the fuel tank(s) 12 to the aircraft power plants (e.g. engines 9 and/or fuel cells 90) so as to channel hydrogen fuel to the power plants (these fuel lines 14a may alternatively be referred to as hydrogen distribution lines 14a). Hydrogen fuel lines 14b may extend from refuelling ports 16 located on an outer surface of the aircraft 1 to the fuel tank(s) 12 (these fuel lines may be referred to as hydrogen refuelling lines 14b).

Dependent on the respective location of the fuel tank(s) 12, power plants, and refuelling ports 16, the hydrogen fuel lines 14a, 14b may extend significant distances through the wing box structure of the wings 2, 3 and/or through the structure of the fuselage 4. In the example shown in FIG. 2, the hydrogen fuel lines 14a extend from the engines 9 on the wings 2, 3 to a hydrogen fuel tank 12 located in the fuselage 4, and hydrogen fuel lines 14b extend from the hydrogen fuel tank 12 to a refuelling port 16 located aft of the hydrogen fuel tank 12 in the fuselage 4. In the example shown in FIG. 3, the hydrogen fuel lines 14a extend from the engines 9 on the wings 2, 3 to a hydrogen fuel tank 12 located on the wing 2, 3, and hydrogen fuel lines 14b extend from the hydrogen fuel tank 12 to a refuelling port 16 outboard of the hydrogen fuel tank 12. It will be understood that there are many further permutations, but that at least some of the hydrogen fuel lines 14a, 14b are required to extend significant distances across the aircraft 1.

Figure 4:
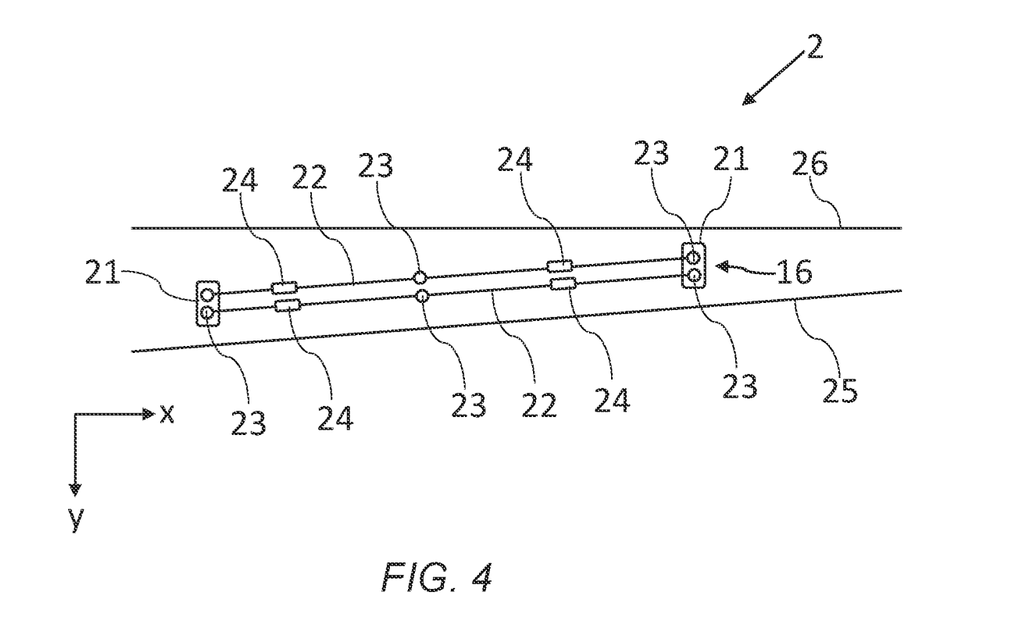
FIG. 4 shows a schematic of a fuel line in a wing viewed from above the aircraft.
Figure 5:
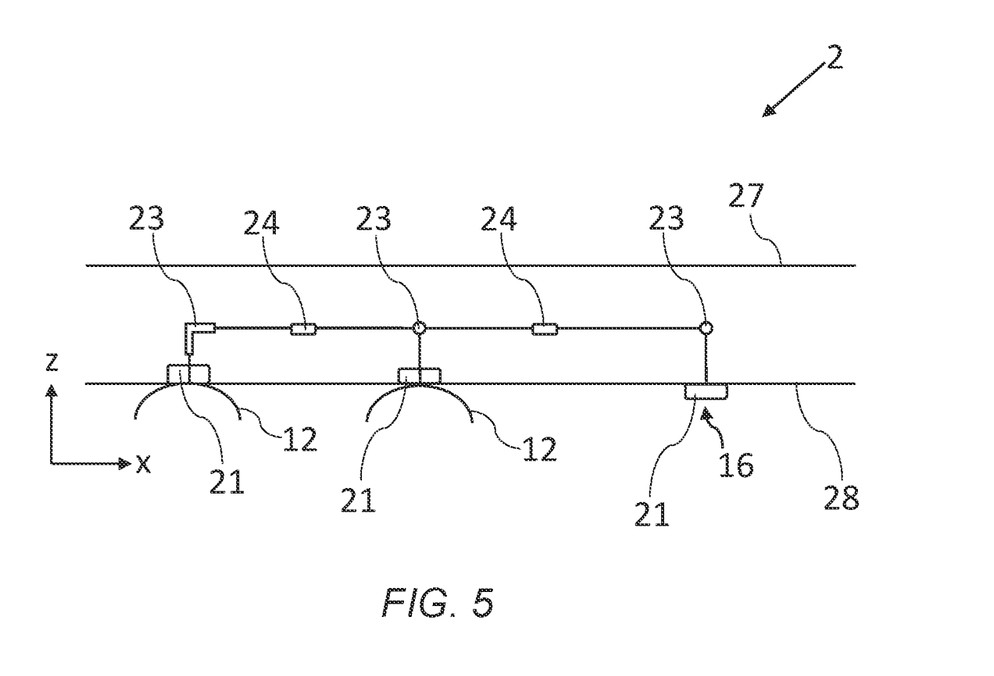
FIG. 5 shows a schematic of the fuel line in the wing viewed in the z-x plane.

Typical hydrogen fuel lines 14a, 14b (e.g. a refuel line, fuel supply line or return line) will be fixedly attached at connectors 21 at either end and include various pipes 22, couplings 23, bellows (e.g. axial compensators 24), as well as valves and control sensors. For instance, FIGS. 4 & 5 show a hydrogen line 14a, 14b in the port wing 2 and extending in the spanwise direction (x-direction) between a leading edge 25 and a trailing edge 26, an upper cover 27 and a lower cover 28 of the wing 2. The longitudinal direction of the aircraft 1 is indicated generally as the y-direction, and the vertical axis is indicated generally as the z-direction.

The fuel line 14a may include a connector 21 at each end, and several couplings 23 and axial compensators 24 along the length of the fuel line 14a, 14b. This can help to mitigate the effect of airframe deflections caused by aerodynamic and other external loads. The axial displacements of the fuel lines 14a, 14b need to be accounted for due to the exposure of the fuel lines 14a, 14b to a wide range of operating temperatures ranging from the cryogenic temperatures of the liquid hydrogen to the potentially much higher temperatures of ambient, for which axial compensators or similar can be used. The connections between these various parts are a significant potential source of leaks and can increase thermal ingress. However, these various parts assist the hydrogen fuel lines 14a, 14b in withstanding the axial and out-of-plane deflections often encountered by the hydrogen fuel lines 14a, 14b.

Leak mitigation and leak prevention are therefore important factors when designing and implementing hydrogen fuel lines 14a, 14b.

Figure 6:
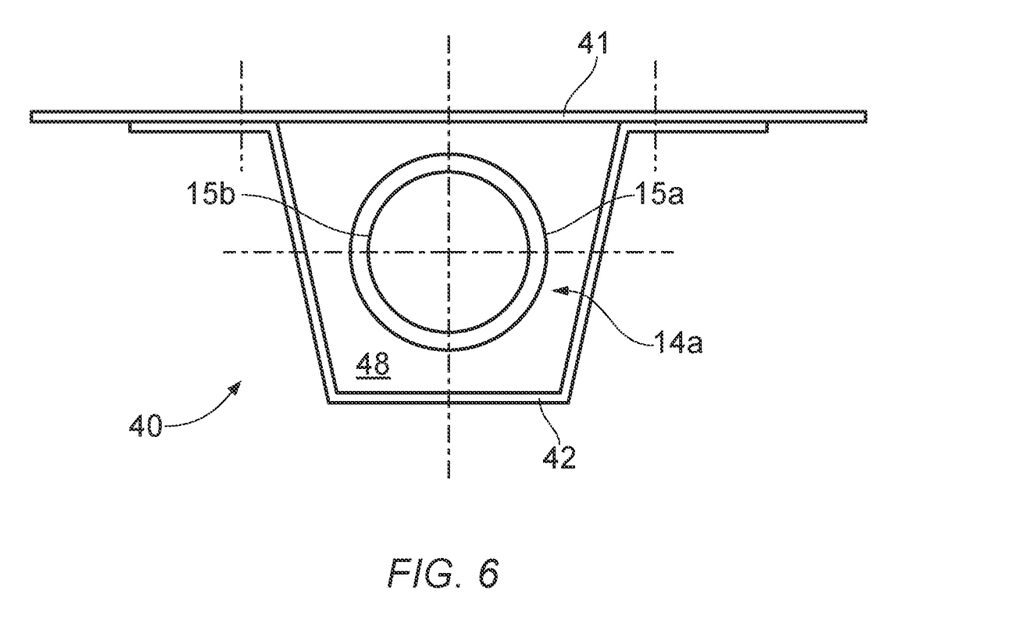
FIG. 6 shows an aircraft assembly according to an example of the invention.

FIG. 6 shows an aircraft assembly 40. The aircraft assembly includes an aircraft panel 41, and a generally U-shaped channel 42 attached to the aircraft panel 41.

Whilst the channel 42 is described as generally U-shaped channel, it will be appreciated that the channel 42 may be any suitable shape for housing a hydrogen fuel line 14a, 14b. For example, the channel 42 may be V-shaped, omega-shaped or any other suitable variation of shape that defines a containment space.

The aircraft panel 41 and the channel 42 define a containment space 48 within. The hydrogen fuel line 14a, 14b extends through the containment space 48. The containment space 48 is sealed such that any hydrogen fuel leaked/emitted from the hydrogen fuel line 14a, 14b is contained within the containment space 48.

The hydrogen fuel line 14a, 14b may be spaced from the channel 42, so as to reduce heat transfer between the hydrogen fuel line 14a, 14b and the channel 42. The containment space 48 may be held at vacuum pressure to further reduce heat transfer between the hydrogen fuel line 14a, 14b and the channel 42. Alternatively, the containment space 48 may contain a high concentration of an inert gas, such as nitrogen. The concentration of the insert gas may be greater than 98%, or 99%. The containment space 48 may comprise substantially no oxygen to prevent a reaction with the hydrogen fuel.

The hydrogen fuel line 14a, 14b may comprise a first fuel pipe 15a and a second fuel pipe 15b, the first fuel pipe 15a surrounding the second fuel pipe 15b. Such an arrangement may provide further insulation to hydrogen fuel in the second fuel pipe 15b.

Figure 7:
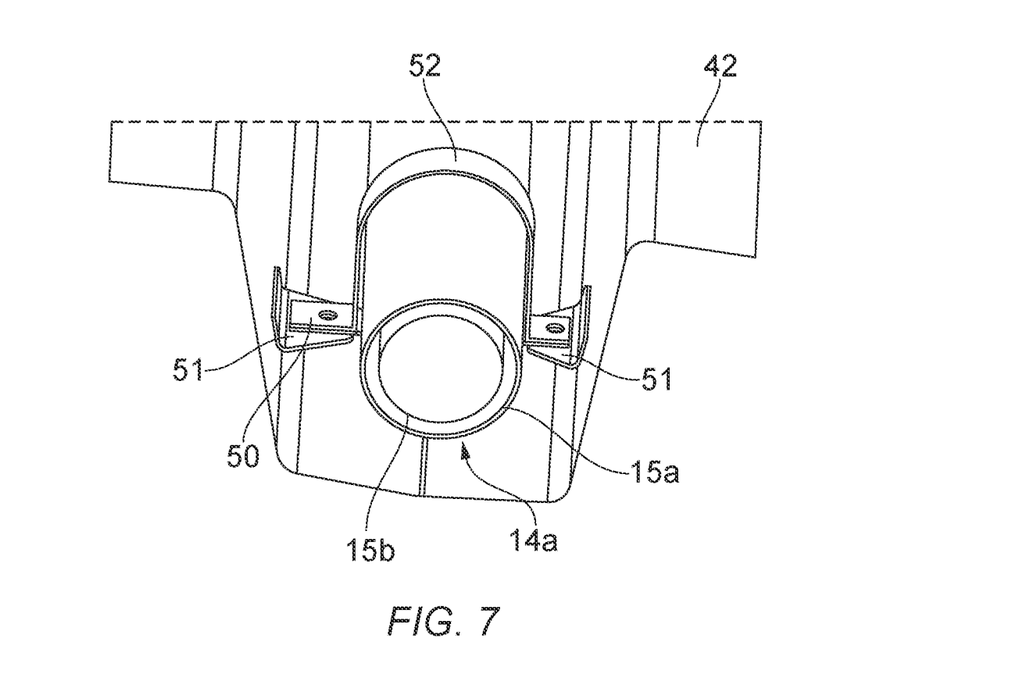
FIG. 7 shows an example of the aircraft assembly in which the fuel line is supported by a bracket in a channel.

FIG. 7 shows an example in which a hydrogen fuel line 14a is spaced from the channel 42 by a bracket 50. The bracket 50 may include one or more clip portions 51 that attach to the walls of the channel 42. A support portion 52 may extend across at least a portion of the hydrogen fuel line 14a, 14b to retain the hydrogen fuel line 14a, 14b in position relative to the channel 42. The clip portions 51 may be integrally formed with the support portion 52 or, as shown for example in FIG. 7, may be separately attach to the support portion 52 (e.g. by fasteners or other means known in the art).

Figure 8:
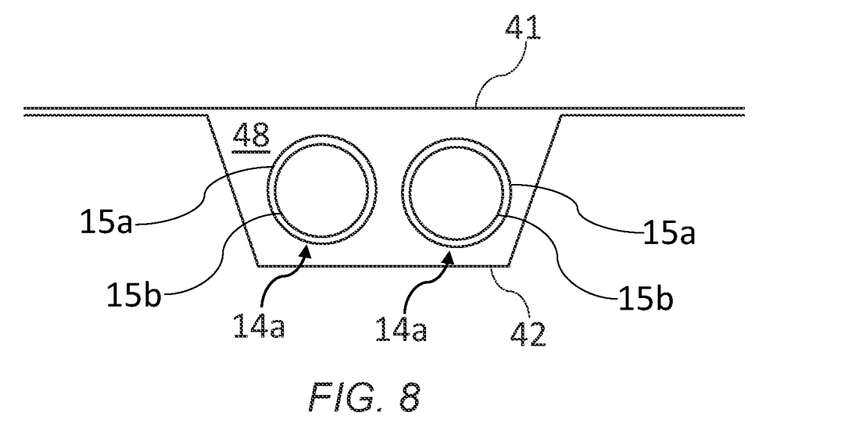
FIG. 8 shows a channel comprising two hydrogen fuel lines.

It will be appreciated that in some examples, two or more hydrogen fuel lines 14a, 14b may extend in a common direction for at least a portion of their length. The two or more hydrogen fuel lines 14a, 14b may perform separate functions (e.g. a refuel line, a return line, or a safety vent line), and/or further hydrogen fuel lines 14a, 14b may be provided for redundancy, for example in the event that one or more of the hydrogen fuel lines 14a, 14b is inoperable or otherwise inadequate. In some examples, the two or more hydrogen fuel lines 14a, 14b may be located in a common channel 42. FIG. 8 shows an example in which two hydrogen fuel lines 14a extend through a common U-shaped channel 42.

The hydrogen fuel lines 14a, 14b may comprise one or more junctions at which three or more sections of the hydrogen fuel line 14a, 14b intersect. FIG. 3 shows an example in which the hydrogen fuel line 14a comprises at least one T-junction.

Figure 9A:
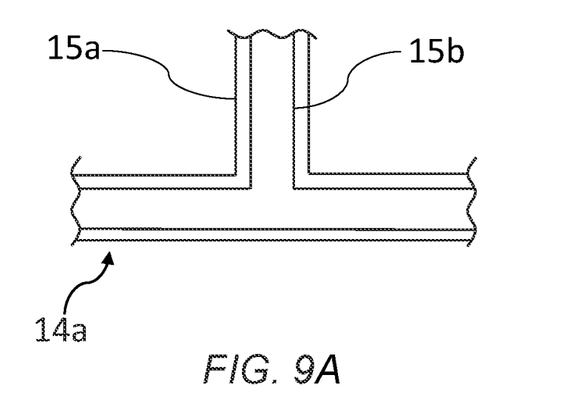
FIGS. 9A and 9B shows a junction of the hydrogen fuel line within a junction of the channel.
Figure 9B:
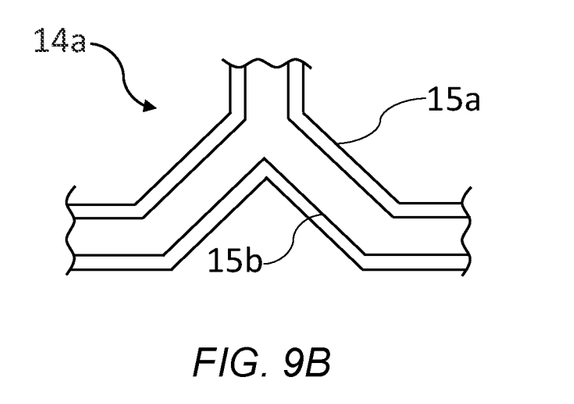

To account for this divergence in the hydrogen fuel lines 14a, 14b, the channel 42 may similarly comprise an intersection that encloses the hydrogen fuel lines 14a, 14b. FIG. 9A shows an example in which the U-shaped channel 42 encloses a T-junction of the hydrogen fuel line 14a with a corresponding T-junction of the U-shaped channel 42. However, it will be appreciated that the intersection may be any suitable shape, e.g. a generally Y-shaped configuration such as shown in FIG. 9B.

The channel 42 extends substantially the entire length of the hydrogen fuel line 14a, 14b, so that a sealed containment space can be defined around the hydrogen fuel line 14a, 14b for containing any hydrogen fuel leaked from the hydrogen fuel line 14a, 14b.

A valve 55 may be fluidically connected to the sealed containment space so that any hydrogen gas, or other contaminants in the sealed containment space, can be selectively evacuated from the containment space. The valve 55 may be selectively operable to open and close, so that the contents of the containment space can be selectively evacuated.

The valve 55 may be connected at a first end to the containment space and at a second end to atmosphere, such that the contents within the containment space can be emptied to atmosphere. In some examples, the valve 55 may comprise a rupture disc configured to release gaseous pressure within the containment space when the pressure in the containment space exceeds a set pressure.

Figure 10:
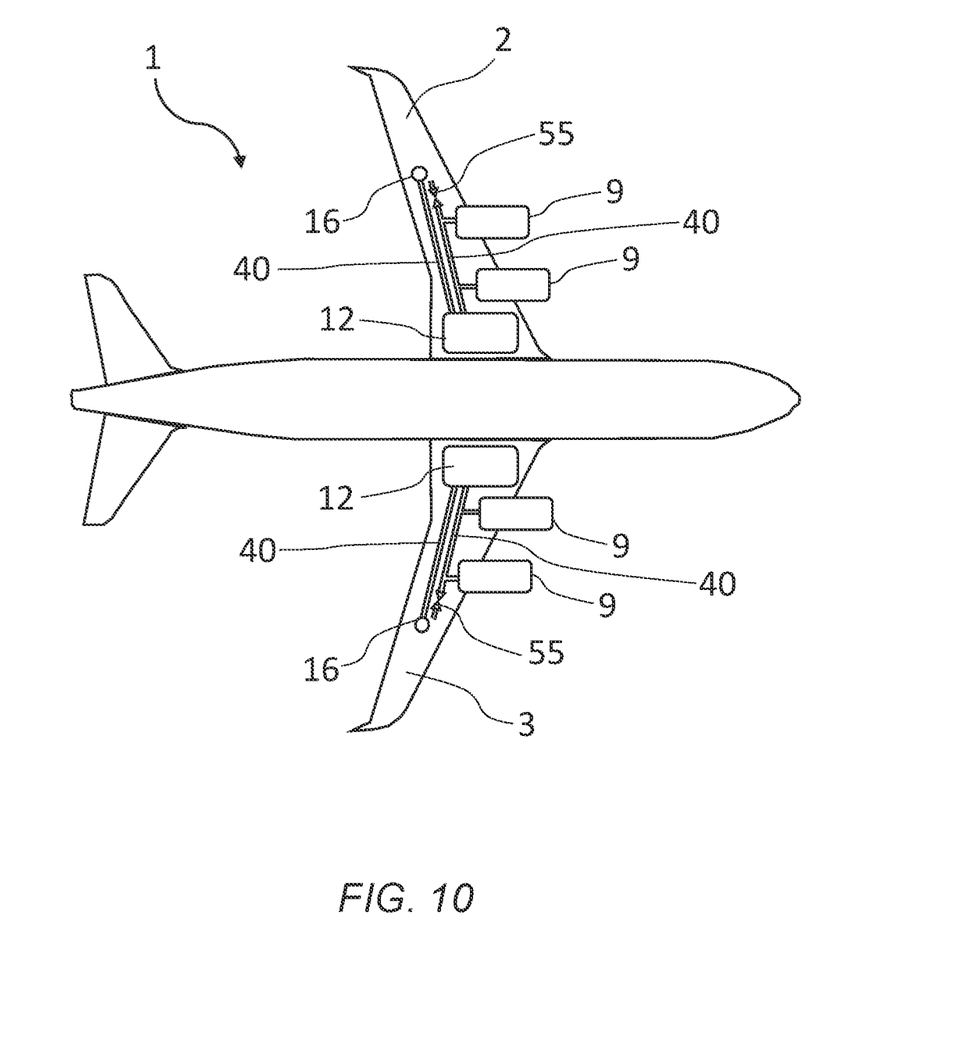
FIG. 10 shows an aircraft with a valve for selectively releasing gases from the channel.

As shown in FIG. 10, in some examples, the hydrogen fuel line 14a, 14b may extend through the aircraft wing 2, 3, such that the channel 42 also extends through the aircraft wing 2, 3. Specifically, the channel 42 may extend from a fuel tank(s) 12 to one or more aircraft engines 9. One end of the channel 42 may comprise a valve 55.

In cases in which the channel 42 extends through the aircraft wing 2, 3, the aircraft panel 41 to which the channel 42 attaches may comprise a spar 61a, 61b or cover 62a, 62b of the wing box 60 of the aircraft 1.

Figure 11:
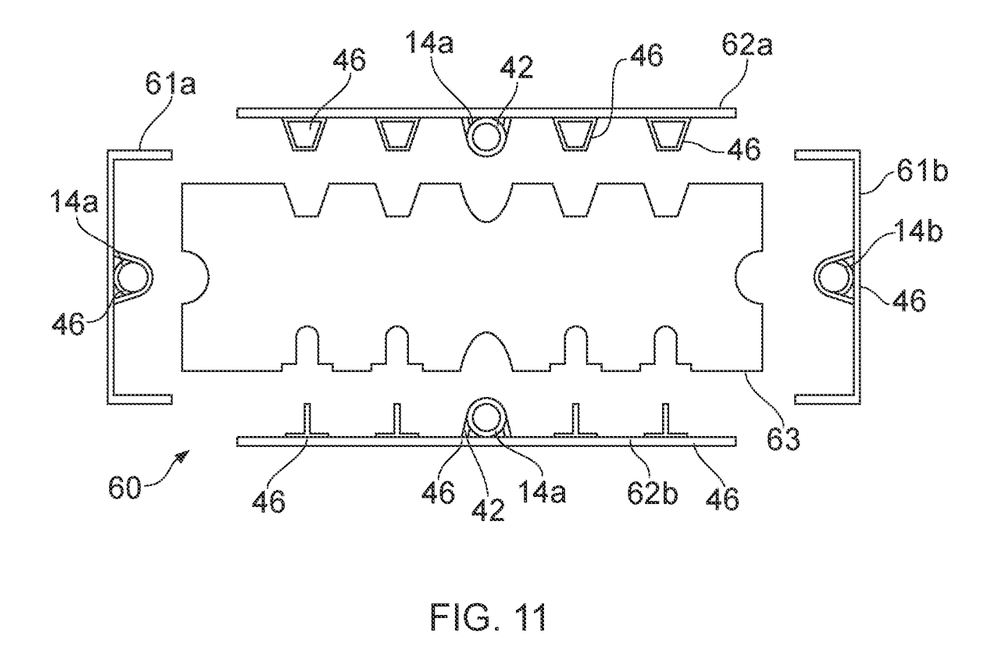
FIG. 11 shows a wing box assembly.

With this arrangement, the channel 42 may be pre-attached to the aircraft panel 41 (i.e. spar 61a, 61b or cover 62a, 62b) as a sub-assembly. In this way, at least a portion of the channel 42 and the hydrogen fuel line 14a, 14b may be attached to the aircraft panel 41 when the wing box 60 is initially assembled. Typically, fuel lines (such as the hydrogen fuel lines 14a, 14b discussed above) are inserted into the wing box 60 after the wing box 60 has been assembled, e.g. by removing the lower cover 28. However, many of the assembled parts of the wing box 60 (e.g. the wing ribs 63) disrupt the ability of adding the fuel lines 14a, 14b and thereby necessitate steps such as providing multiple shortened sections of fuel line 14a, 14b, or removing parts of wing box 60. This adds unnecessary manufacturing steps and slows down assembly.

By attaching the channel 42 to the aircraft panel 41 as a sub-assembly, prior to assembly of the wing box 60, it will be apparent that many of these difficulties are overcome. For example, the channel 42 may be attached to an aircraft panel 42, and subsequently attached to a plurality of wing ribs 63, thereby saving significant assembly time.

In some of the disclosed examples, the channel 42 may provide structural support. In the example shown in FIG. 11, the channel 42 is one of a plurality of stiffeners 46 (only some of which are labelled) of the wing 2, 3 extending along a portion of the wing 2, 3 of the aircraft 1.

Figure 12:
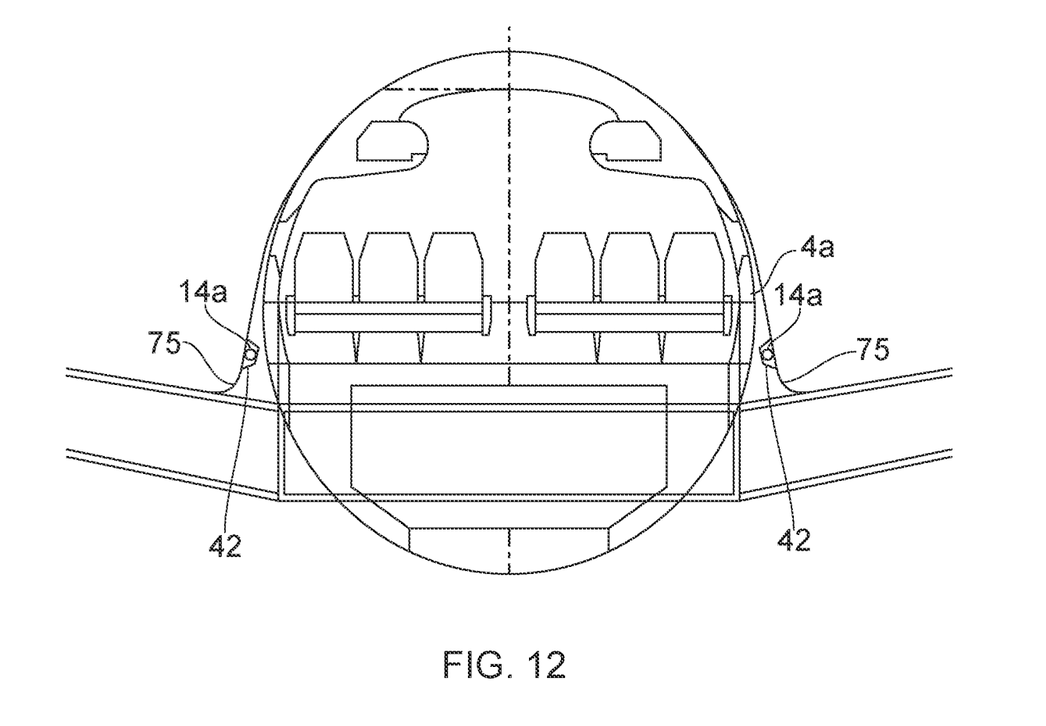
FIG. 12 shows a fuselage assembly.

In some examples, the hydrogen fuel lines 14a, 14b may extend, in addition, or alternatively, along and adjacent to the fuselage 4. For example, the hydrogen fuel lines 14a, 14b may extend outside the pressure shell 4a of the fuselage 4. By placing the hydrogen fuel lines 14a, 14b outside the pressure shell 4a of the fuselage 4, any fuel leaks that might occur from the hydrogen fuel lines 14a, 14b are contained outside the pressure shell 4a.

To ensure the hydrogen fuel lines 14a, 14b are not exposed to the outside airflow, the hydrogen fuel lines 14a, 14b may be covered by a fairing 75. The fairing has an outer aerodynamic surface exposed to the external airflow over the aircraft 1. The fairing 75 defines an unpressurised space between the pressure shell 4a and the fairing 75.

FIG. 12 shows an example in which the hydrogen fuel line 14a is located between the fairing 75 and the pressure shell 4a of the fuselage 4, so that the hydrogen fuel line 14a is outside the pressure shell 4a of the fuselage 4. A channel 42 attaches to the fairing 75, so that a sealed containment space is defined around the hydrogen fuel line 14a.

It will be appreciated that, in some examples, the channel 42 may be pre-attached to the fairing 75 as a sub-assembly. A fuel line 14a, 14b may be located in the channel 42. As with the sub-assembly of the wing box 60 described above, this may help to speed up the assembly of the aircraft 1.

It will be appreciated that access to the containment space within the channel 42 may be provided by any suitable means.

Figure 13A:
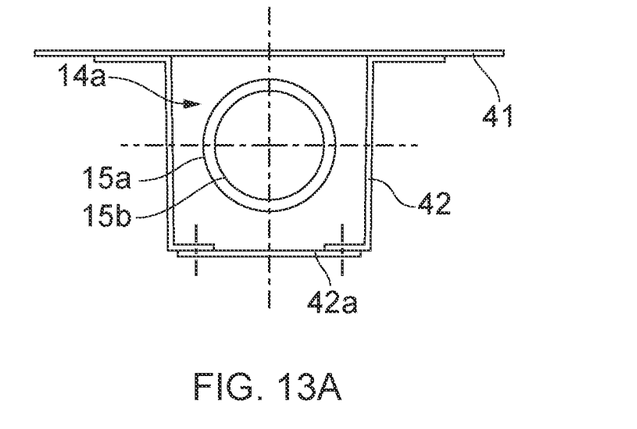
FIG. 13A shows an example of a channel.

FIG. 13A shows an example in which an upper portion 42a of the u-shaped channel 42 is removeable so as to provide access to the containment space.

Figure 13B:
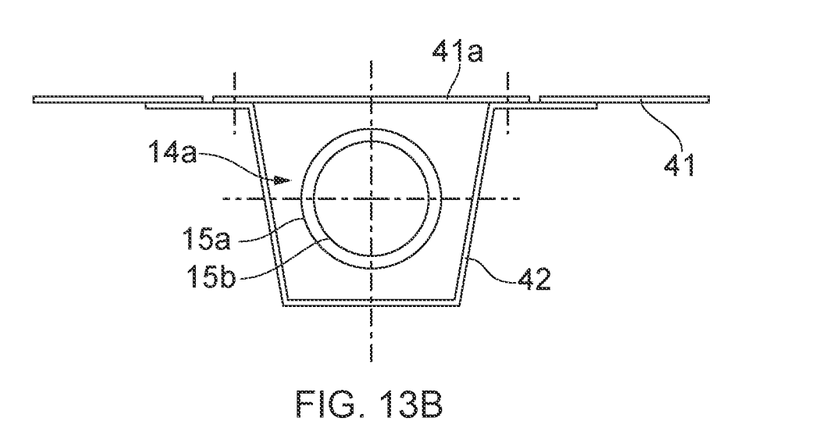
FIG. 13B shows an alternative example of a channel.

FIG. 13B shows an alternative example in which a portion 41a of the aircraft panel, such as example the upper cover 62a, is removeable so as to provide access to the containment space.

In some examples, the channel 42 may be integrally formed with the aircraft panel 41.

Figure 13C:
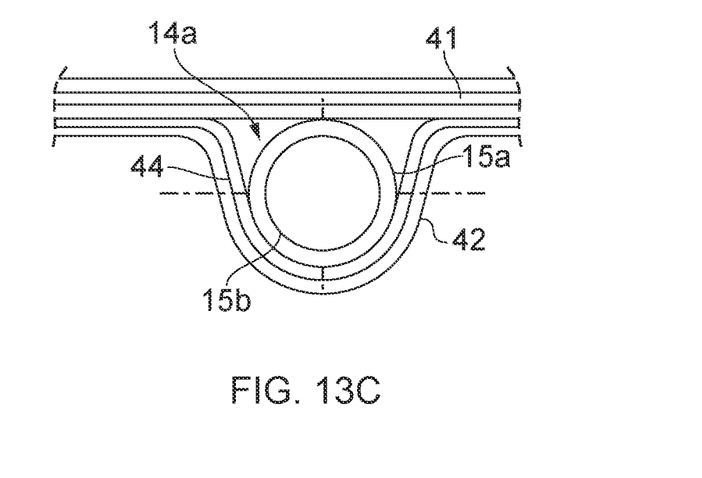
FIG. 13C shows a further example of a channel.

FIG. 13C shows an example in which the aircraft panel 41 and the channel 42 comprise fibre-reinforced composite materials. Similarly, the aircraft panel 41 may comprise fibre-reinforced composite materials. The aircraft panel 41 and the channel 42 may be integrally formed, e.g. by co-curing or co-bonding.

It will be appreciated that the fuel line 14a shown in FIG. 13C contacts the aircraft panel 41 and the channel 42, however in alternative examples the fuel line 14a, 14b may be spaced from the aircraft panel 41 and/or channel 42.

In order to decrease the permeability of the channel 42 (e.g. the permeability to liquid or gaseous hydrogen), the U-shaped channel 42 may comprise a metallic layer 44, such as shown in FIG. 13C.

In such examples, the fuel line 14a, 14b may be accessible via the wing tip 11. For example, the fuel line 14a, 14b may be inserted or removed from the channel 42 by removing at least part of the wing tip 11.

As previously discussed in relation to FIG. 7, the hydrogen fuel line 14a, 14b may be spaced from the channel 42 by any suitable means, such as a bracket 50 or similar device.

Figure 14A:
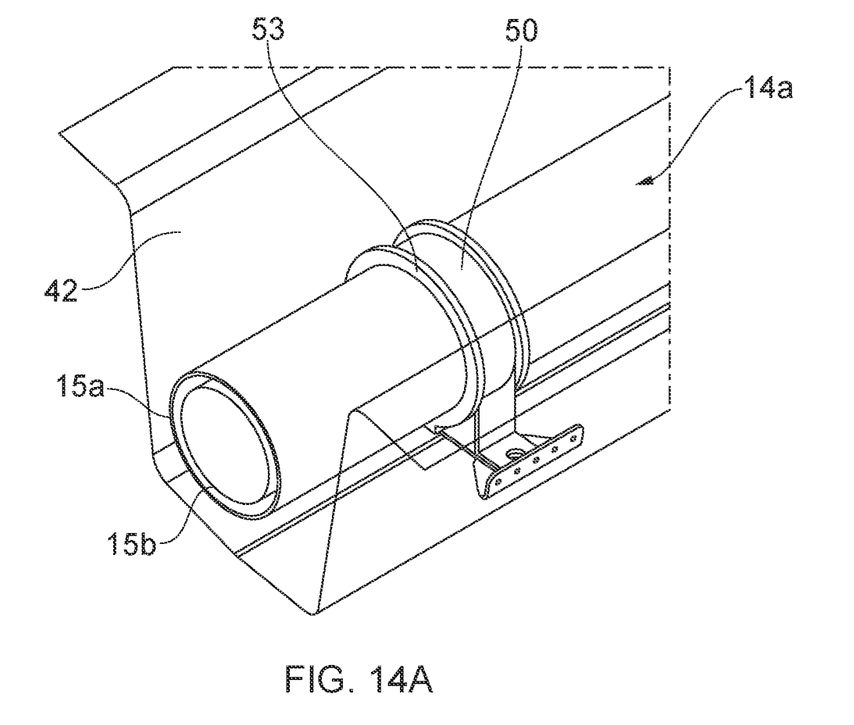
FIG. 14A shows a bracket for supporting the hydrogen fuel line.

The bracket 50 may be formed of metal. As shown in FIG. 14A, an elastomer seal 53 may be provided between the bracket 50 and the hydrogen fuel line 14a, 14b that reduces heat transfer between the hydrogen fuel line 14a, 14b and the channel 42.

Figure 14B:
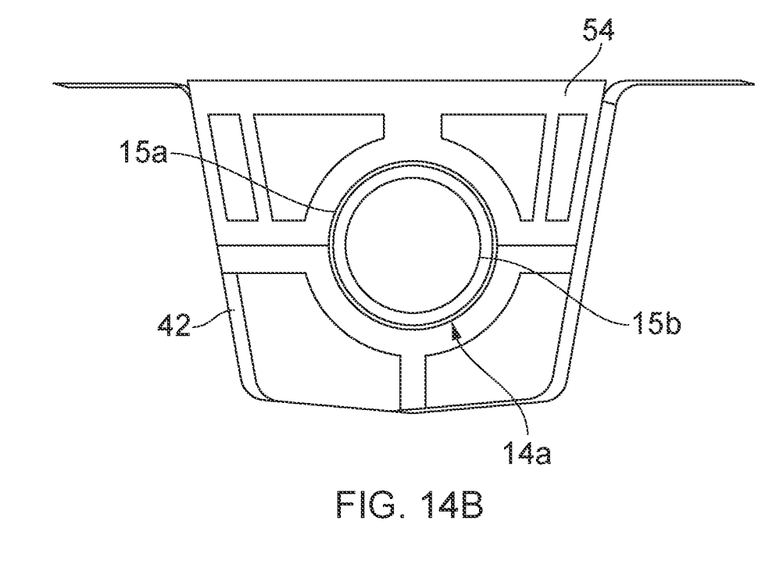
FIG. 14B shows a foam spacer for supporting the hydrogen fuel line.

In an alternative example, such as shown in FIG. 14B, a foam spacer 54 may be formed that separates the hydrogen fuel line 14a, 14b from the channel 42 and reduces heat transfer therebetween. The foam spacer 54 may be shaped, or otherwise cut, to provide a containment space for containing any hydrogen fuel emitted from the hydrogen fuel lines 14a, 14b.

In some examples, the hydrogen fuel line 14a, 14b may be substantially unconstrained along its axial direction between a first end 31 and a second end 32, with at least one end 31, 32 of the hydrogen fuel line 14a, 14b moveable in the axial direction of the hydrogen fuel line 14a, 14b.

Figure 15:
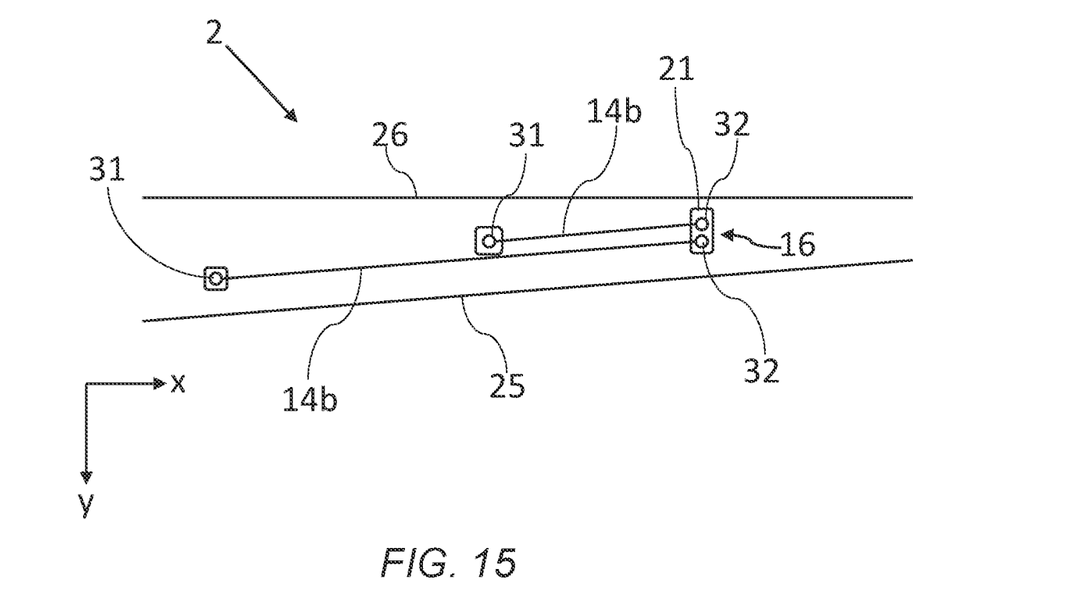
FIG. 15 shows part of a fuel system of an aircraft.

FIG. 15 shows an example in which two hydrogen fuel lines 14b extend from a respective hydrogen fuel tank 12 at a first end to a common aircraft refuelling port 16. The hydrogen fuel lines 14a, 14b are substantially unconstrained at the first end 31, located at each fuel tank 12, and attach to a common coupling 21 at the second end 32, located at the aircraft refuelling port 16 of the aircraft 1 (it will be appreciated the second may alternatively or in addition by unconstrained).

Such an arrangement can help to mitigate the effects of various loads imparted on the hydrogen fuel lines 14a, 14b (e.g. loads imposed by wing bending, thermal expansion, thermal contraction, or other loads), as an end 31, 32 of the hydrogen fuel 14a, 14b is able to move to compensate for any axial forces applied to the hydrogen fuel lines 14a, 14b.

In this context, substantially unconstrained refers to the end of the hydrogen fuel line 14b not being fixedly attached, although it may still be attached at the end 31, 32 in some manner, if the constraint allows at least some relative axial movement to compensate for the loads acting on the hydrogen fuel lines 14a, 14b.

By providing a hydrogen fuel line 14a, 14b that is moveable in its axial direction, the number of pipes, couplings, bellows and other components of the hydrogen fuel line 14a, 14b may be reduced or eliminated.

Figure 16:
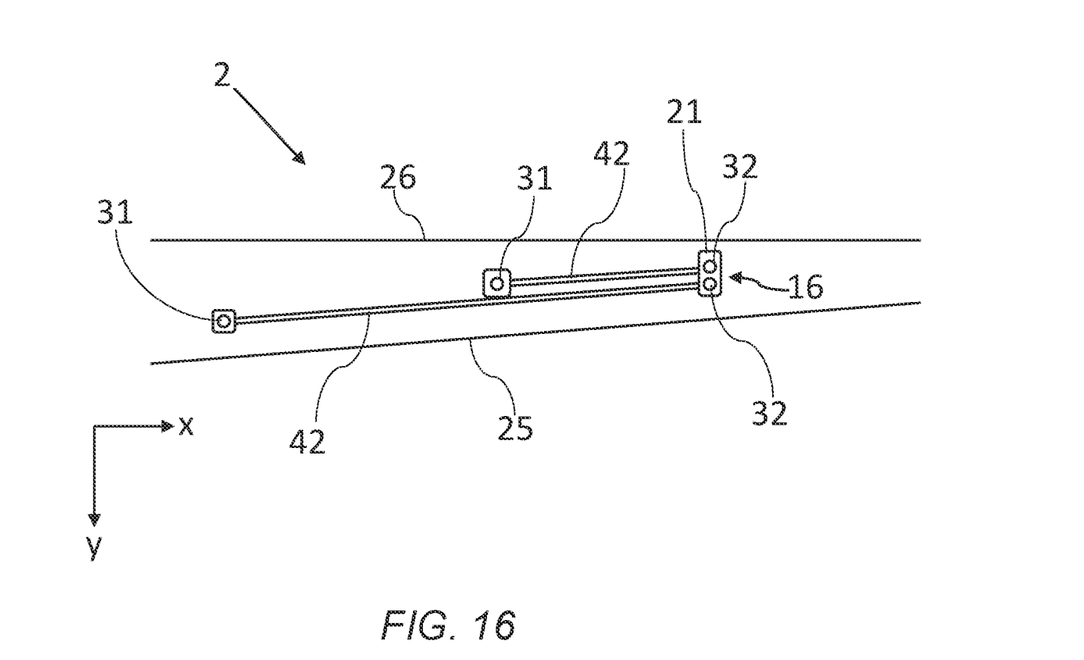
FIG. 16 shows the fuel lines of the fuel system of FIG. 15 contained in channels.

As in the examples described above, and shown in FIG. 16, the hydrogen fuel line(s) 14a, 14b is disposed in a channel 42. In order to accommodate the axial movement of the hydrogen fuel line 14a, 14b, the hydrogen fuel line 14a, 14b inside the channel 42 may be configured to be moveable relative to the channel 42.

It will be appreciated that the examples are described above are applicable to a hydrogen fuel line 14a, 14b extending between any suitable components of the aircraft 1, and may extend through any sections of the aircraft (e.g. the wings 2, 3, fuselage 4, or therebetween).

Figure 17:
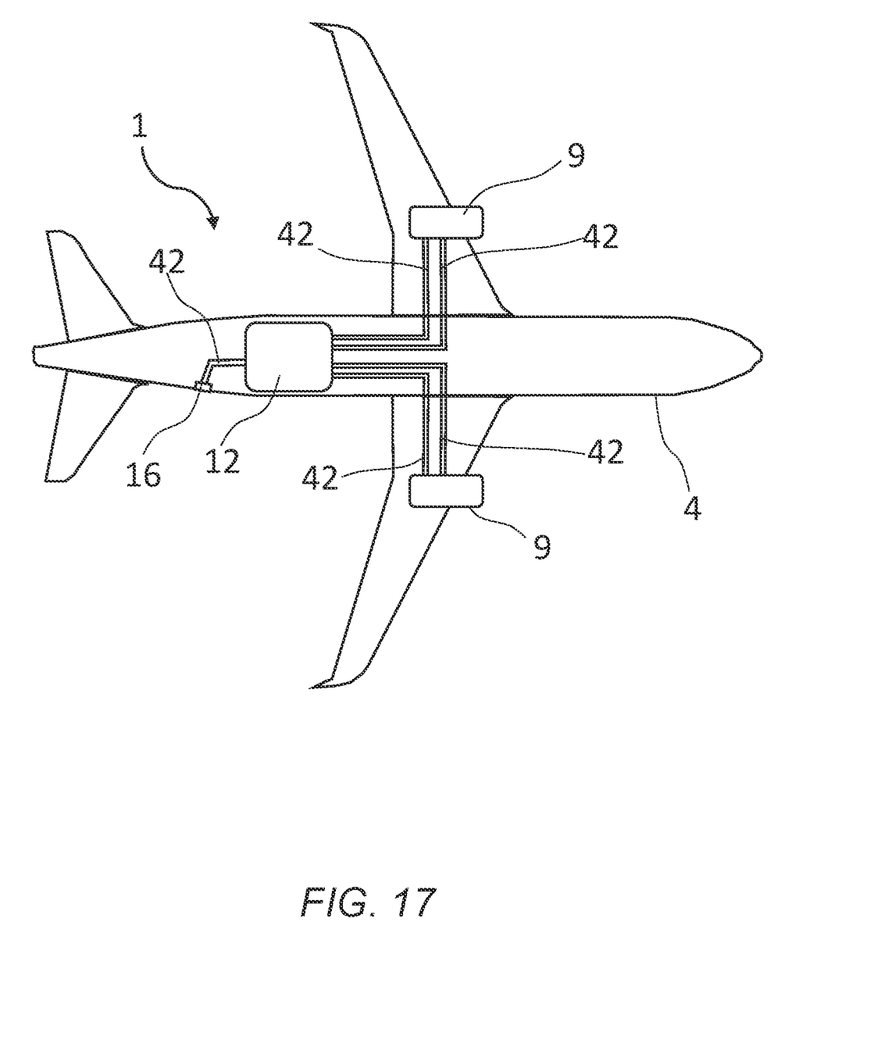
FIG. 17 shows an example in which a hydrogen fuel tank is located in the fuselage.

FIG. 17 shows an example in which a hydrogen fuel tank 12 is located in the fuselage 4, with a plurality of channels 42 (housing hydrogen fuel lines 14a) extending between the hydrogen fuel tank 12 and respective aircraft engines 9 located on the wings 2, 3.

In addition, a channel 42 (housing a hydrogen fuel line 14b) extends from the hydrogen fuel tank 12 to an aircraft refuelling port 16 located on the fuselage 4, although it will be understood that the aircraft refuelling port 16 may be located elsewhere on the aircraft 1.

Whilst the examples above show an aircraft 1 that includes hydrogen fuel lines 14a, 14b that are part of a fuel system which directly burns the liquid hydrogen, it will be understood that the fuel system is equally applicable to hydrogen fuel lines 14a, 14b forming part of any aircraft power plant system that includes fuel cells 90.

Figure 18:
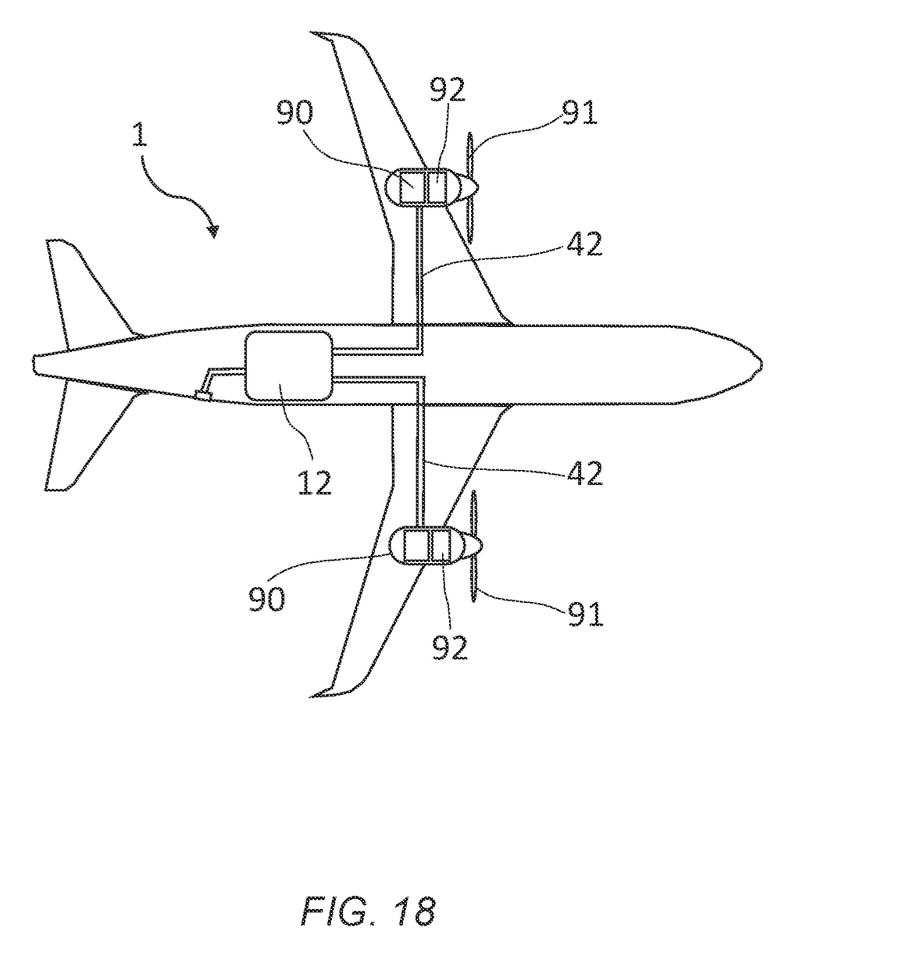
FIG. 18 shows a further example of an aircraft fuel system for a fuel cell powered aircraft.

FIG. 18 shows an example in which an aircraft 1 includes fuel cells 90 configured to power an electromotor 92, that drive one or more propellers 91. A channel 42 (housing a hydrogen fuel line 14a) extends from the hydrogen fuel tank 12 to each of the fuel cells 90, with the hydrogen converted to electricity by the fuel cells 90 to power (e.g.) the electromotor 92.

The examples described above reference an aircraft 1 including one fuel tank 12, although it will be appreciated that the aircraft 1 may include any suitable number of fuel tanks 12 (e.g. two, three, or more). One or more of the fuel tanks 12 may be co-located, so as to be located directly next to one another, and/or one or more of the fuel tanks 12 may be located in different locations on the aircraft 1. For example, one or more fuel tanks 12 may be located in the wings 2, 3, and one or more fuel tanks 12 may be located in the fuselage 4. The fuel tanks 12 may be located in separate parts of the wings 2, 3, such as towards a wing tip and towards a wing root, and may be located in separate parts of the fuselage 4, such as towards a nose end 5 and towards a tail end 6 of the fuselage 4. The one or more fuel tanks 12 may be mounted to an outer surface of the aircraft 1, such as mounted to a wing 2, 3 in a fuel pod.

The examples described above refer to the engines 9 and/or fuel cells 90 as being located on the wings 2, 3, although it will be appreciated that the engines 9 and/or fuel cells 90 may be located on any suitable part of the aircraft, such as the fuselage 4.

It will be appreciated that reference to a hydrogen fuel line 14a, 14b may refer to any suitable hydrogen fuel line 14a, 14b arrangement, including e.g. two or three pipes arranged concentrically, and one or more sections of pipe between various connectors 21, couplings 23, bellows (e.g. axial compensators 24), and valves 55.

The examples described above refer to the fuel as hydrogen fuel, however it will be appreciated that the examples, and many of the advantages described, are equally applicable to a fuel line 14a, 14b suitable for carrying any cryogenic fuel.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft assembly, comprising:
   an aircraft panel;
   a channel attached to the aircraft panel;
   a fuel line for carrying cryogenic fuel, the fuel line disposed in the channel; and
   a sealed containment space around the fuel line for containing cryogenic fuel leaked from the fuel line, the containment space defined between the channel, the fuel line, and the aircraft panel; and,
   wherein the cryogenic fuel line is spaced from the channel.

2. The aircraft assembly of claim 1, further comprising a bracket, wherein the cryogenic fuel line is spaced from the channel by the bracket.

3. The aircraft assembly of claim 2, wherein the bracket further comprises at least one clip portion attached to a wall of the channel.

4. The aircraft assembly of claim 1, wherein the aircraft panel comprises a spar of an aircraft wing and/or a cover of an aircraft wing.

5. A method of assembling an aircraft wing box, comprising:
   the aircraft assembly of claim 4;
   the method comprising:
      attaching the aircraft assembly to one or more aircraft wing ribs.

6. The aircraft assembly of claim 1, wherein the fuel line is configured to convey hydrogen fuel, and preferably liquid hydrogen fuel.

7. The aircraft assembly of claim 1, wherein the channel comprises fibre-reinforced composite materials having a metallic layer configured to decrease the permeability of the channel.

8. The aircraft assembly of claim 1, wherein the aircraft panel comprises fibre-reinforced composite materials.

9. The aircraft assembly of claim 1, comprising a vacuum or nitrogen in the containment space.

10. The aircraft assembly of claim 1, wherein the fuel line is moveable axially relative to the channel.

11. The aircraft assembly of claim 1, comprising a valve fluidically connected at a first end to the containment space and at a second end to atmosphere.

12. The aircraft assembly of claim 1, wherein the aircraft panel comprises an aircraft outer skin and/or a fairing.

13. The aircraft assembly of claim 1, comprising two or more fuel lines for carrying cryogenic fuel, the fuel lines disposed in the channel.

14. The aircraft assembly of claim 1, comprising an aircraft wing, wherein the channel extends along at least a portion of the aircraft wing.

15. The aircraft assembly of claim 1, comprising an aircraft wing box, wherein the channel is within the wing box.

16. The aircraft assembly of claim 1, comprising an aircraft fuselage, wherein the channel extends along at least a portion of the aircraft fuselage.

17. An aircraft comprising the aircraft assembly of claim 1.

18. The aircraft assembly of claim 1, wherein the sealed containment space further comprises at least one foam spacer around the fuel line for containing cryogenic fuel leaked from the fuel line; and,
   wherein the at least one foam spacer is shaped and configured to contain any cryogenic fuel emitted from the cryogenic fuel line.

* * * * *